United States Patent
Lee (10) Patent No.: US 11,881,118 B2
(45) Date of Patent: Jan. 23, 2024

(54) COMPLETE DENTURE PATIENT SIMULATOR AND MANUFACTURING METHOD THEREOF

(71) Applicant: Subin Lee, Goyang-si (KR)

(72) Inventor: Subin Lee, Goyang-si (KR)

( * ) Notice: Subject to any disclaimer, the term of this patent is extended or adjusted under 35 U.S.C. 154(b) by 1349 days.

(21) Appl. No.: 16/205,220

(22) Filed: Nov. 29, 2018

(65) Prior Publication Data

US 2019/0355279 A1 Nov. 21, 2019

(30) Foreign Application Priority Data

May 16, 2018 (KR) .......................... 10-2018-0055921

(51) Int. Cl.
| | | |
|---|---|---|
| *G09B 23/28* | (2006.01) | |
| *B29C 45/16* | (2006.01) | |
| *B29K 83/00* | (2006.01) | |
| *B29L 31/00* | (2006.01) | |

(52) U.S. Cl.
CPC ........ *G09B 23/283* (2013.01); *B29C 45/1676* (2013.01); *B29K 2083/00* (2013.01); *B29K 2995/007* (2013.01); *B29L 2031/753* (2013.01)

(58) Field of Classification Search
CPC .............. G09B 23/283; B29C 45/1676; B29K 2083/00; B29K 2995/007; B29L 2031/753; A61C 13/20; A61C 13/34
USPC ........................................................ 434/263
See application file for complete search history.

(56) References Cited

U.S. PATENT DOCUMENTS

| | | | | |
|---|---|---|---|---|
| 3,931,679 A | * | 1/1976 | Carter ................... | G09B 23/283 |
| | | | | 434/264 |
| 4,601,664 A | * | 7/1986 | Bertino, III .......... | G09B 23/283 |
| | | | | 434/264 |
| 2011/0294103 A1 | * | 12/2011 | Segal ................... | G09B 23/283 |
| | | | | 434/263 |
| 2013/0288565 A1 | * | 10/2013 | McMullen ............. | A63H 3/365 |
| | | | | 446/321 |
| 2014/0106327 A1 | * | 4/2014 | Hemmer .............. | G09B 23/283 |
| | | | | 434/267 |
| 2018/0012515 A1 | * | 1/2018 | Loan ........................ | G09B 9/00 |

FOREIGN PATENT DOCUMENTS

| | | |
|---|---|---|
| KR | 200422578 Y | 7/2006 |
| KR | 101080919 B | 11/2011 |
| KR | 1020140024318 A | 2/2014 |
| KR | 1020150111646 A | 10/2015 |
| KR | 1020170006361 A | 1/2017 |
| KR | 1020180021453 A | 3/2018 |

\* cited by examiner

*Primary Examiner* — Robert P Bullington
*Assistant Examiner* — Stephen Alvesteffer (57) ABSTRACT

The present invention relates to a complete denture patient simulator and a manufacturing method thereof that provide the most similar facial shape to a real patient and allow movements of muscles in the oral cavity upon treatment to be represented in the same manner as upon the treatment of the real patient. According to the present invention, the complete denture patient simulator includes: an oral cavity portion having a maxilla-shaped body and a mandible-shaped body; a skin portion having the open mouth formed integrally with the oral cavity portion; and a deformation portion adapted to allow the oral cavity portion and the skin portion to be movable.

10 Claims, 6 Drawing Sheets

COMPLETE DENTURE PATIENT SIMULATOR AND MANUFACTURING METHOD THEREOF

CROSS-REFERENCE TO RELATED APPLICATIONS

This patent application claims priority under 35 U.S.C. § 119 to Korean Patent Application No. 10-2018-0055921 filed on May 16, 2018, the entire contents of which are incorporated by reference herein.

TECHNICAL FIELD

The present invention relates to a complete denture patient simulator and a manufacturing method thereof that are provided for complete denture education, and more particularly, to a complete denture patient simulator and a manufacturing method thereof that provide the most similar orofacial shape to a real patient and allow movements of muscles in the oral cavity upon treatment to be represented in the same manner as upon the treatment of the real patient, when complete denture education is carried out for students related to dental clinics, so that a quality of the prosthodontic education before clinical practices can be improved through the patient simulator to enhance the real patient's satisfaction in the complete denture making.

BACKGROUND

Generally, dental education like complete denture making for students in educational organizations like dental schools is carried out by taking impression the shape of the alveolar bone on the surface of a model of the alveolar bone in the mouth by means of a stock tray and an impression material, making a diagnostic model for practice by means of plaster, applying wax onto the surface of the diagnostic model, making an individual tray using a tray resin applied to the surface of the diagnostic model, fitting the individual tray and the shape of the alveolar bone to each other one more time, and performing complete denture training through known denture making procedures.

Unlike partial denture fabrication, further, the complete denture fabrication requires more precise impression in the shape of the alveolar bone because muscles around the oral cavity are moved, and upon the complete denture treatment for a patient, accordingly, a green modeling compound is placed on the periphery of the individual tray after the individual tray has been made and is then inserted into the oral cavity of the patient. Next, border molding for the movements of the muscles around the oral cavity or for the extension limit of the denture is carried out.

In case where the complete denture surgery practice is performed through the alveolar bone model, the practice for the impression of the simple shape of the alveolar bone is carried out, but a precise practice in response to the movements of the muscles around the oral cavity cannot be performed, so that a quality of learning through the practice is lowered and the learning through the practice cannot be exerted well in a clinical practice through a real patient.

SUMMARY

Accordingly, the present invention has been made in view of the above-mentioned problems occurring in the prior art, and it is an object of the present invention to provide a complete denture patient simulator and a manufacturing method thereof that provide the movements of muscles in the oral cavity of a real patient and the changes in the shape of the mouth upon the complete denture treatment of the real patient to students, thereby making it possible to practice impression taking through a more precise anatomic manner, that allow the position relationship between the maxillary alveolar bone and the mandibular alveolar bone to be the same as the anatomic structure of the patient, thereby making it possible to record jaw relationship as the most difficult step in the complete denture manufacturing procedure to improve learning effectiveness and quality of the students, that replace edentulous patients therewith to overcome the limitation in the clinical practice education due to the difficulties in the supply of the edentulous patients, and that improve the patient's satisfaction in his or her treatment through the improvement in the quality of the complete denture treatment.

It is another object of the present invention to provide a complete denture patient simulator and a manufacturing method thereof that allow portions like the face, the tongue, the mucous membrane in the mouth, and the alveolar bone in the mouth to have different elasticity and hardnesses from each other to provide the hardnesses similar to the oral structure of a real patient, thereby improving learning effectiveness of a complete denture fabrication.

To accomplish the above-mentioned objects, according to a first aspect of the present invention, there is provided a complete denture patient simulator including: a skin portion made by multi-layer painting a soft silicone to a given thickness on a portion A from the forehead of the face to the philtrum and a portion C from the jaw lower portion to the neck; a deformation portion made by filling a soft silicone in a portion B including the mucous membrane around the lips, cheeks and the tongue; filling portions made by injecting and filling a hard or intermediate-hard silicone into internal spaces of the portion A from the forehead of the face to the philtrum and the portion C from the jaw lower portion to the neck; and an oral cavity portion formed inside the deformation portion to constitute the alveolar bone made of a hard or intermediate-hard silicone, wherein the skin portion, the deformation portion, the filling portions, and the oral cavity portion having different hardnesses are attached integrally to each other in a curing process.

According to the present invention, desirably, the soft silicone has 30 A hardness and the hard or intermediate-hard silicone has 50 A hardness.

According to the present invention, desirably, the mold and the oral cavity mold are made of plaster or synthetic resin.

To accomplish the above-mentioned objects, according to a second aspect of the present invention, there is provided a method for manufacturing a complete denture patient simulator, the method including: (S1) outer face shape mockup manufacturing step wherein an outer shape of the human face is carvedly made; (S2) mold manufacturing step wherein a separating agent is applied to the surface of the mockup, a mold on which the front surface of the face is molded is made of plaster or synthetic resin, and lip portions of the mold on the front surface of the face in a state where the lips are open are formed integrally with an oral cavity mold for molding the alveolar bone inside the mouth; (S3) first silicone filling step wherein silicones having different hardnesses are multi-layer painted onto the inside of the mold in such a manner as to have a given thickness, a soft silicone being painted onto a portion (A) from the forehead of the mold to the philtrum, onto a portion (B) including the mucous membrane around the lips, cheeks and the tongue, and onto a portion (C) from the jaw lower portion to the neck, and a hard or intermediate-hard silicone being painted onto the oral cavity mold in such a manner as to have the given thickness; (S4) second silicone filling step wherein in the state where the silicones are semi-cured through the first silicone filling step (S3), a hard or intermediate-hard silicone is filled in the internal space of the mold in such a manner as to be cured integrally with the soft silicone first filled; and (S5) mold removing step wherein the soft silicone and the hard or intermediate-hard silicone filled in the interior of the mold are curedly attached to each other and the molded silicone patient simulator is removed from the mold.

According to the present invention, desirably, the soft silicone has 30 A hardness and the hard or intermediate-hard silicone has 50 A hardness.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, the present invention is disclosed with reference to the attached drawings in the manner where the embodiments of the present invention are easily carried out by those skilled in the art. However, this does not limit the invention within specific embodiments and it should be understood that the invention covers all the modifications, equivalents, and replacements within the idea and technical scope of the invention.

Figure 1:
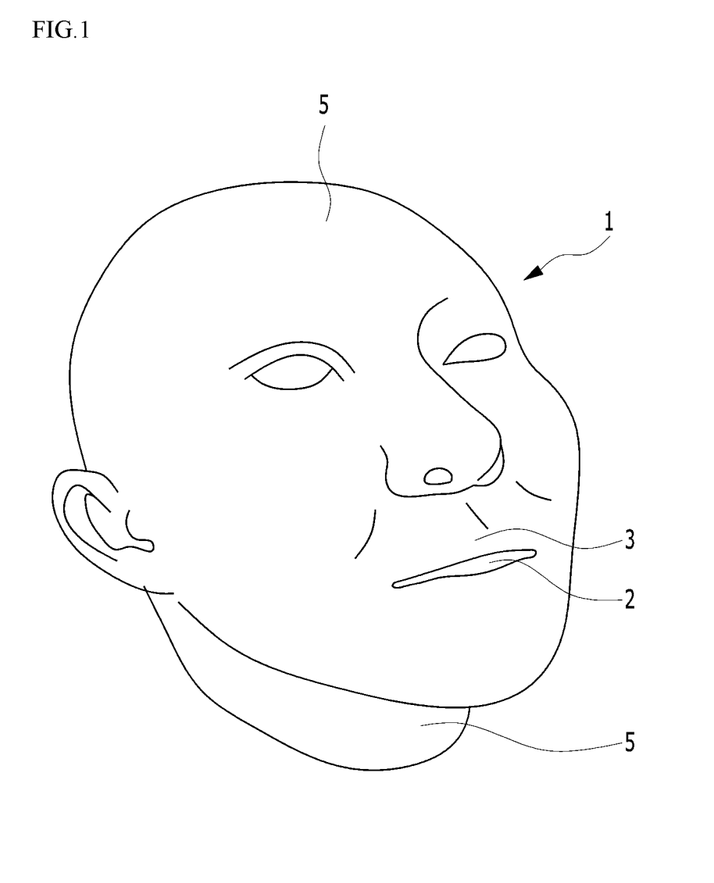
FIG. 1 is a photograph showing a complete denture patient simulator according to the present invention.
Figure 2:
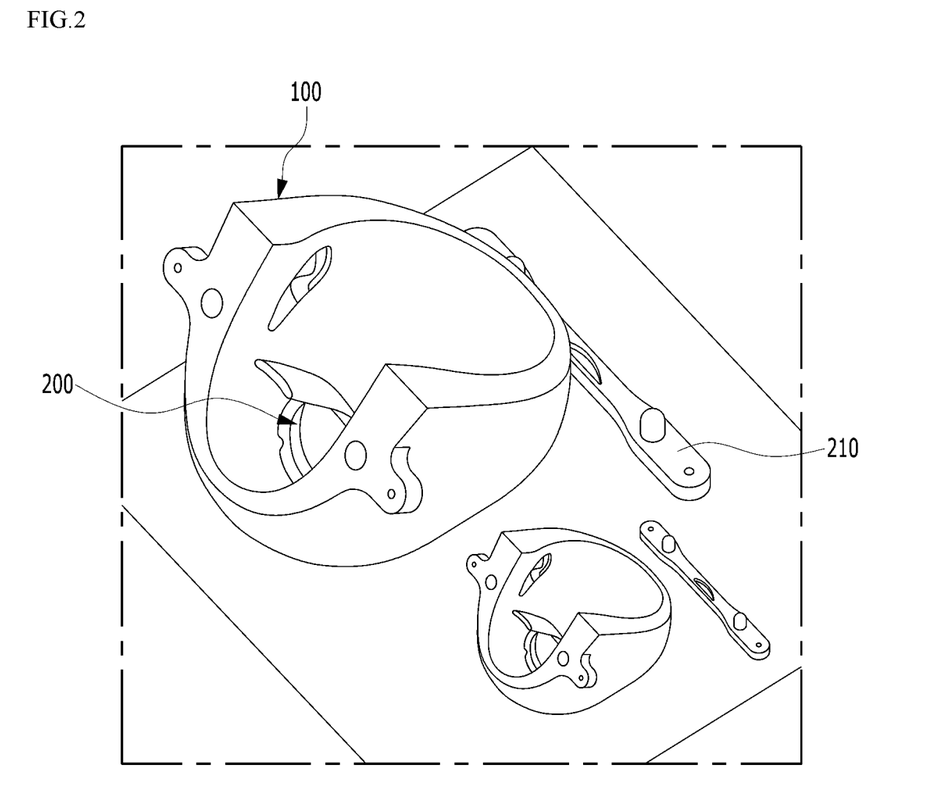
FIG. 2 is a photograph showing a mold for making the complete denture patient simulator according to the present invention.
Figure 3:
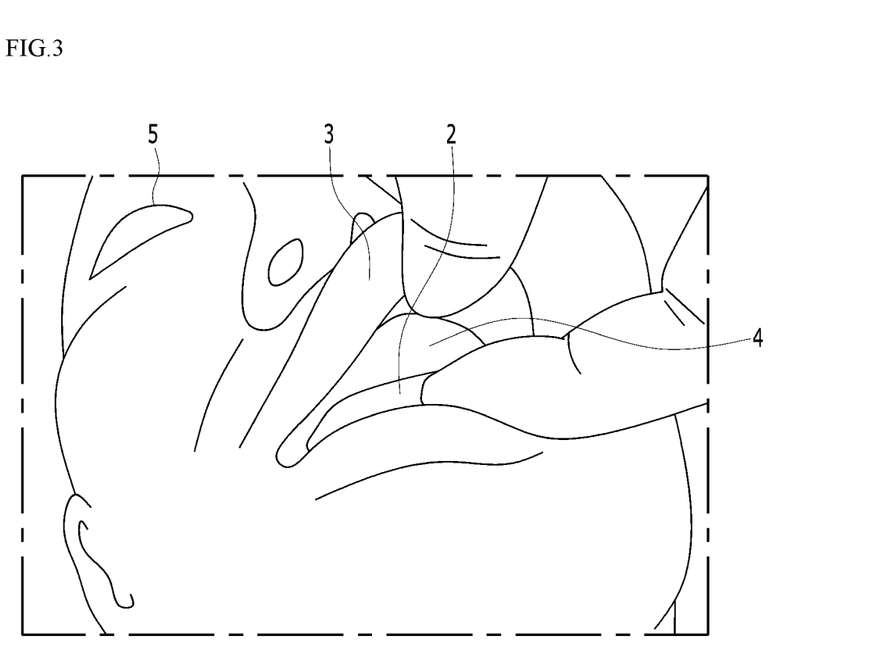
FIG. 3 is a photograph showing a state where the mouth of the complete denture patient simulator according to the present invention is open to expose the alveolar bone to the outside.
Figure 4:
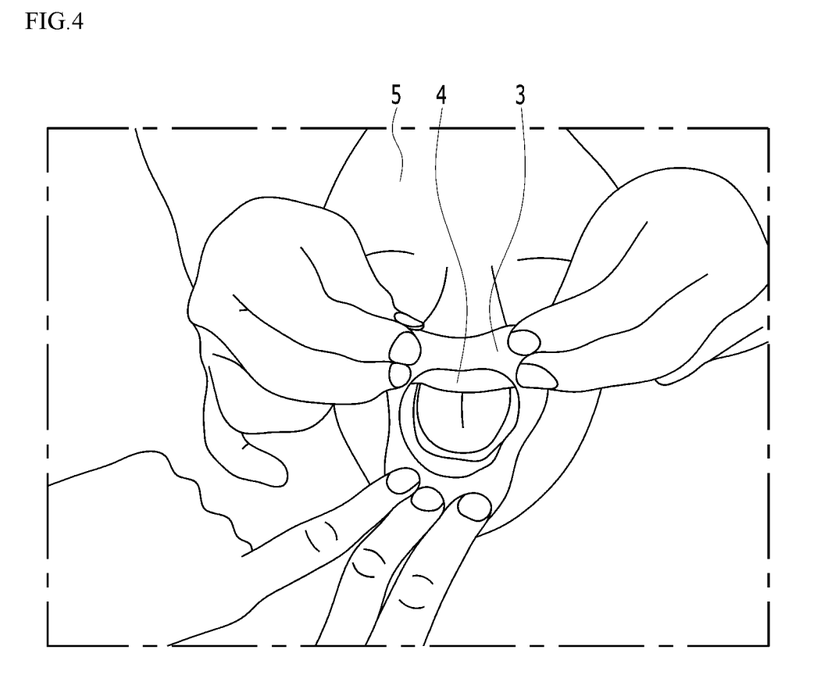
FIG. 4 is a photograph showing a state where the mouth of the complete denture patient simulator according to the present invention is open to expose the upper and lower alveolar bones and the tongue to the outside.
Figure 5:
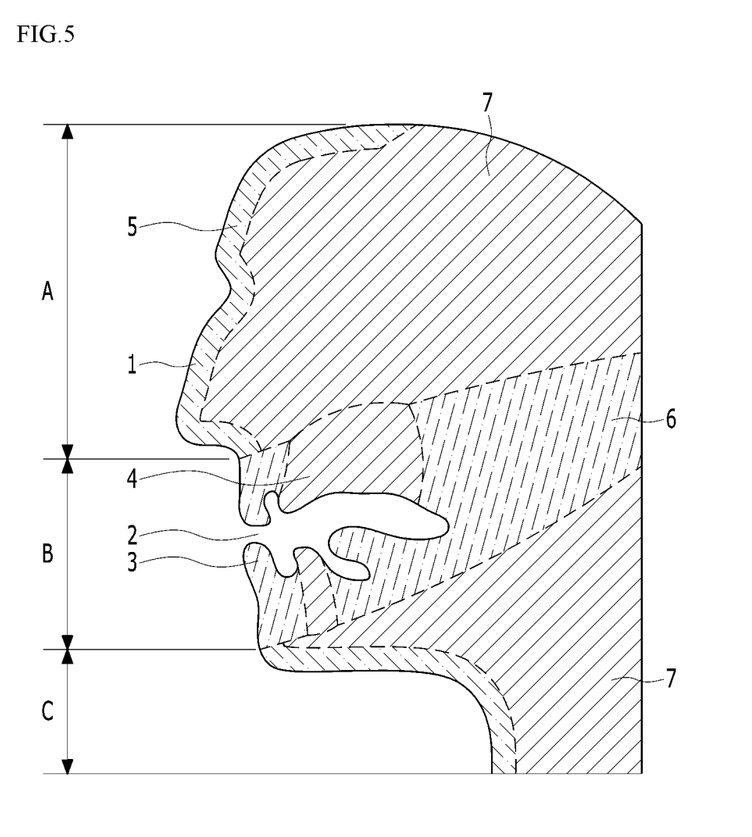
FIG. 5 is a schematic sectional view showing an internal shape of the complete denture patient simulator according to the present invention.

FIG. 1 is a photograph showing a complete denture patient simulator according to the present invention, FIG. 2 is a photograph showing a mold for making the complete denture patient simulator according to the present invention, FIG. 3 is a photograph showing a state where the mouth of the complete denture patient simulator according to the present invention is open to expose the alveolar bone to the outside, FIG. 4 is a photograph showing a state where the mouth of the complete denture patient simulator according to the present invention is open to expose the upper and lower alveolar bones and the tongue to the outside, and FIG. 5 is a schematic sectional view showing an internal shape of the complete denture patient simulator according to the present invention.

As shown, a complete denture patient simulator 1 (hereinafter, referred to as "patient simulator") according to the present invention has a shape of the human head having an opening 2 formed on the mouth 3.

According to the greatest characteristics of the patient simulator 1, further, silicones having different hardnesses are partially used to make one patient simulator 1, and accordingly, the hardness of the patient simulator 1 is similar to the hardness of the human skin expandable, so that upon the complete denture education using the alveolar bone formed in an interior of the patient simulator 1, movements of muscles in the oral cavity are represented to allow impression taking practices and jaw relationship recording practices to be achieved through a more precise anatomic manner only with the patient simulator 1, thereby improving education effectiveness and quality.

In detail, as shown, the patient simulator 1 includes: a skin portion 5 made by multi-layer painting a soft silicone having 30 A hardness to a given thickness on a portion A from the forehead of the face to the philtrum and a portion C from the jaw lower portion to the neck; a deformation portion 6 made by filling a soft silicone having 30 A hardness in a portion B including the mucous membrane around the lips, cheeks and the tongue to the extent capable of covering an oral cavity portion 4; and filling portions 7 made by injecting and filling a hard or intermediate-hard silicone into internal spaces of the portion A from the forehead of the face to the philtrum and the portion C from the jaw lower portion to the neck.

Further, the oral cavity portion 4 constituting the alveolar bone is formed inside the deformation portion 6, and the oral cavity portion 4 is formed of a hard or intermediate-hard silicone having 50 A hardness, so that the hardness of the oral cavity portion 4 is similar to the alveolar bone of a patient.

Now, an explanation on the patient simulator 1 according to the present invention will be in detail given.

The oral cavity portion 4 includes a maxilla-shaped body and a mandible-shaped body. The maxilla-shaped body includes a palate-shaped body and a maxillary alveolar bone-shaped body formed integrally with the palate-shaped body. Also, the mandible-shaped body includes a tongue-shaped body and a mandibular alveolar bone-shaped body formed integrally with the tongue-shaped body. The palate-shaped body, the maxillary alveolar bone-shaped body, and the mandibular alveolar bone-shaped body are formed by multi-layer laminating the hard or intermediate-hard silicone. At this time, the silicone is multi-layer painted to a given thickness. On the other hand, the maxilla-shaped body, and the mandible-shaped body are connected integrally with the skin portion 5.

The skin portion 5 includes the open mouth 3 formed integrally with the oral cavity portion 4. Further, the skin portion 5 includes the eyes, the nose, and the ears. The skin portion 5 is formed by multi-layer laminating the soft silicone. On the other hand, the mouth is desirably open to a size less than 5 mm.

The interior of the skin portion 5 is filled with the filling portions 7. In this case, the filling portions 7 are separately filled into upper and lower ends around the oral cavity portion 4. The filling portions 7 are filled with hard or intermediate-hard silicone, and otherwise, they are formed by multi-layer laminating the hard or intermediate-hard silicone. According to the present invention, on the other hand, the interior of the skin portion 5 is filled with the filling portions 7, but the filling portions 7 may be replaced with frames for maintaining the shape of the skin portion 5.

The deformation portion 6 is adapted to allow the oral cavity portion 4 and the skin portion 5 to be movable. At this time, the deformation portion 6 is made by filling or multi-layer laminating soft silicone between the upper filling portion 7 and the lower filling portion 7, and the soft silicone is coupled integrally with the skin portion 5. Like this, the deformation portion 6 is coupled integrally with the skin portion 5 formed between the palate and the ears, so that the maxilla-shaped body and the mandible-shaped body can be moved (open).

In this case, desirably, the hard or intermediate-hard silicone is in a range of 40 to 60 A hardness, and the soft silicone is in a range of 25 to 35 A hardness.

Under the above-mentioned configuration of the patient simulator 1 according to the present invention, the patient simulator 1 can be maintained in shape by means of the filling portions 7 formed in the upper and lower portions thereof, and the deformation portion 6 constituting the portion B including the mucous membrane around the lips, cheeks and the tongue is formed of the soft silicone freely deformable, while the oral cavity portion 4 formed inside the deformation portion 6 is being formed of the hard or intermediate-hard silicone in such a manner as to be similar to the patient's oral structure, so that the deformation of the oral cavity portion 4 because of the movements of the muscles in the oral cavity of the patient upon complete denture treatment can be easily checked to allow impression taking practices to be achieved through a more precise anatomic manner only with the patient simulator 1.

Figure 6:
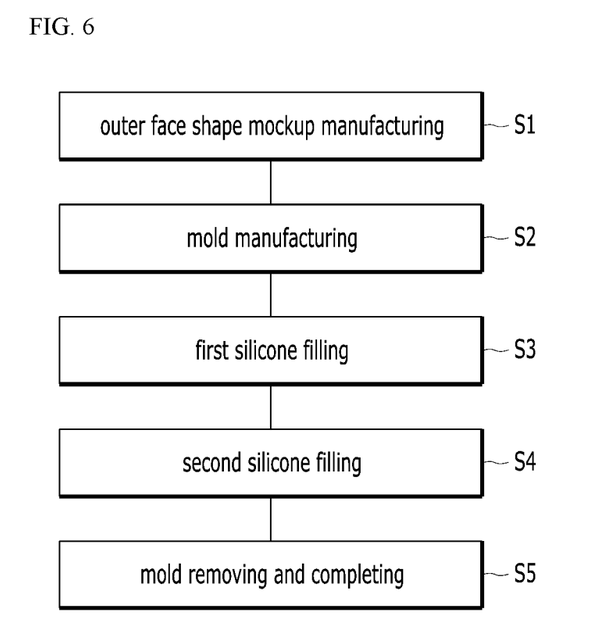
FIG. 6 is a flowchart showing a method for manufacturing a complete denture patient simulator according to the present invention.

Hereinafter, an explanation on a method for manufacturing the patient simulator 1 according to the present invention will be in detail given with reference to FIG. 6.

<Outer Face Shape Mockup Manufacturing Step S1>

An outer shape of the human face is carvedly made.

<Mold Manufacturing Step S2>

A separating agent is applied to the surface of the mockup, and a mold on which the front surface of the face is molded is made of plaster or synthetic resin.

Further, lip portions of the mold are formed integrally with an oral cavity mold 200 for molding the alveolar bone inside the mouth, so that the lip portions of the patient simulator to be molded later are open to expose the oral cavity portion to the outside.

Further, the oral cavity portion is precisely made to have the most approximate shape to the alveolar bone of the human body.

On the other hand, the mold can be manufactured precisely through CAD/CAM or 3D printer using a computer.

<First Silicone Filling Step S3>

A silicone filling step is the most essential step of the invention, and as shown in FIG. 5, in detail, silicones having different hardnesses are multi-layer painted onto the inside of the mold in such a manner as to have a given thickness. In this case, a soft silicone having 30 A hardness is painted onto a portion A from the forehead of the mold to the philtrum, onto a portion B including the mucous membrane around the lips, cheeks and the tongue, and onto a portion C from the jaw lower portion to the neck, and a hard or intermediate-hard silicone having 50 A hardness is painted onto the oral cavity mold 200 to a given thickness. Next, the silicones are semi-cured.

Particularly, the upper side (the interior of the mold) of the portion B including the mucous membrane around the lips, cheeks and the tongue is filled and molded with the soft silicones having 30 A hardness, so that the portion B including the mucous membrane around the lips, cheeks and the tongue can be gently moved.

<Second Silicone Filling Step S4>

In the state where the silicones are semi-cured through the first silicone filling step S3, the hard or intermediate-hard silicone having 50 A hardness is filled in the remaining space after the soft silicones having 30 A hardness have been painted onto the internal space of the mold, so that the silicone is cured integrally with the soft silicone first filled.

As the hard or intermediate-hard silicone is filled in the interior of the mold, the deformation of the patient simulator occurs only on the portion B around the mouth, and the deformation on the entire portion except the portion B can be minimized, so that in a process where the mouth is open for the complete denture fabrication, the movements of the muscles of the internal oral cavity portion are provided by means of the soft silicone to provide the movements of the muscles in the oral cavity and the changes in the shape of the mouth upon the complete denture treatment of a real patient to students, thereby making it possible to practice impression taking through a more precise anatomic manner. Further, the position relationship between the maxillary alveolar bone and the mandibular alveolar bone is the same as the anatomic structure of the patient, thereby making it possible to record jaw relationship as the most difficult step in the complete denture fabricating procedures to improve the learning effectiveness of the students.

<Mold removing step S5>

The hard or intermediate-hard silicone having 50 A hardness is filled in the interior of the mold, and next, the second filled hard or intermediate-hard silicone having 50 A hardness to fix the shape of the alveolar bone and the head thereto is curedly attached integrally to the first filled soft silicone having 30 A hardness to express skin tissues. After that, the molded silicone patient simulator is removed from the mold, thereby completing the patient simulator manufacturing step.

According to the patient simulator made with the above-mentioned steps, a practice for impression making for complete denture is carried out with the patient simulator through which the movements of the tongue, the gum, the alveolar bone, and the muscles of the facial surface are represented, so that impression taking practices and jaw relationship recording practices can be achieved through a more precise anatomic manner only with the patient simulator. Further, education effectiveness and quality can be improved through the patient simulator approximate to the shape of the real patient, and education effectiveness of clinical practices for edentulous patients can be improved. Furthermore, the patient's satisfaction in his or her treatment can be enhanced through the improvement in the quality of the complete denture making.

As described above, the complete denture patient simulator according to the present invention is used for the education of the complete denture fabrication as prosthetic rehabilitation, and in this case, the hardnesses of the tongue, the gum, the alveolar bone, and the facial skin constituting the patient simulator are different from each other in such a manner as to be similar to the hardness of the real patient to allow the movements of the muscles in the oral cavity of the edentulous patient to be represented, so that impression taking practices can be achieved through a more precise anatomic manner only with the patient simulator to improve education effectiveness and quality. Further, education effectiveness of clinical practices for edentulous patients can be improved, and also, the patient's satisfaction in his or her treatment can be enhanced through the improvement in the quality of the complete denture making.

In educational organizations like dental schools, particularly, many functions are already known thoroughly with the patient simulator before the clinical practice of complete denture fabrication, so that in spite of difficulties in the supply of patients, a good quality of clinical practice can be achieved.

If the national health insurance fee service for the complete denture fabrication of the patients aged over 65 years is executed, further, complete denture fabrication having many difficulties has to be carried out in dental clinics, and therefore, dentists having excellent complete denture making capability can be cultivated.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A complete denture patient simulator comprising:
    an oral cavity portion having a maxilla-shaped body and a mandible-shaped body;
    a skin portion having an open mouth formed integrally with the oral cavity portion;
    filling portions filled inside the skin portion, wherein the filling portions are separately filled into an upper filling portion and a lower filling portion around the oral cavity portion; and
    a deformation portion adapted to allow the oral cavity portion and the skin portion to be movable;
    wherein,
        the deformation portion is formed by filling a soft silicone or multi-layer laminating a soft silicone and the deformation portion coupled to the oral cavity portion is disposed between the upper filling portion and the lower filling portion; and
        the deformation portion is coupled integrally to the skin portion formed between the philtrum and ears to enable the maxilla-shaped body and the mandible-shaped body to be movable.

2. The complete denture patient simulator according to claim 1, wherein the oral cavity portion comprises:
    a palate-shaped body formed integrally with the maxilla-shaped body;
    a tongue-shaped body formed integrally with the mandible-shaped body;
    a maxillary alveolar bone-shaped body formed integrally with the palate-shaped body; and
    a mandibular alveolar bone-shaped body formed integrally with the tongue-shaped body.

3. The complete denture patient simulator according to claim 2, wherein the palate-shaped body, the maxillary alveolar bone-shaped body, and the mandibular alveolar bone-shaped body are formed by multi-layer laminating a hard or intermediate-hard silicone.

4. The complete denture patient simulator according to claim 3, wherein the hard or intermediate-hard silicone is in a range of 40 to 60 A hardness.

5. The complete denture patient simulator according to claim 2, wherein the tongue-shaped body is filled with the soft silicone or formed by multi-layer laminating the soft silicone.

6. The complete denture patient simulator according to claim 5, wherein the soft silicone is in a range of 25 to 35 A hardness.

7. The complete denture patient simulator according to claim 1, wherein the skin portion further comprises the eyes, the nose, and the ears.

8. The complete denture patient simulator according to claim 1, wherein the skin portion is formed by multi-layer laminating the soft silicone.

9. The complete denture patient simulator according to claim 1, wherein the mouth is open to a size less than 5 mm.

10. The complete denture patient simulator according to claim 1, wherein the filling portions are filled with a hard or intermediate-hard silicone or formed by multi-layer laminating a hard or intermediate-hard silicone.

* * * * *